US008009543B2

(12) United States Patent
Bae et al.

(10) Patent No.: US 8,009,543 B2
(45) Date of Patent: Aug. 30, 2011

(54) HOLOGRAM OPTICAL DEVICE, COMPATIBLE OPTICAL PICKUP INCLUDING THE HOLOGRAM OPTICAL DEVICE, AND OPTICAL INFORMATION STORAGE MEDIUM SYSTEM INCLUDING THE COMPATIBLE OPTICAL PICKUP

(75) Inventors: Jae-cheol Bae, Suwon-si (KR); Tae-kyung Kim, Seoul (KR); Kyong-tae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 11/969,355

(22) Filed: Jan. 4, 2008

(65) Prior Publication Data

US 2008/0247015 A1    Oct. 9, 2008

(30) Foreign Application Priority Data

Apr. 4, 2007    (KR) .................. 10-2007-0033496

(51) Int. Cl.
 *G11B 7/135* (2006.01)
(52) U.S. Cl. ............................. 369/112.07; 369/112.15
(58) Field of Classification Search ......................... None
See application file for complete search history.

(56) References Cited

U.S. PATENT DOCUMENTS

| | | | |
|---|---|---|---|
| 5,909,424 A | 6/1999 | Lee et al. | |
| 6,043,912 A | 3/2000 | Yoo et al. | |
| 6,084,843 A * | 7/2000 | Abe et al. ................. | 369/112.07 |
| 6,552,990 B1 | 4/2003 | Kajiyama et al. | |
| 6,882,614 B2 | 4/2005 | Lee et al. | |
| 6,961,297 B2 * | 11/2005 | Takeda .................... | 369/112.14 |
| 7,072,114 B2 | 7/2006 | Yoo et al. | |
| 2001/0021146 A1 | 9/2001 | Kikuchi et al. | |
| 2002/0024916 A1 * | 2/2002 | Ueyama et al. .......... | 369/112.04 |
| 2003/0197906 A1 | 10/2003 | Furuta et al. | |
| 2003/0227858 A1 * | 12/2003 | Komma ................... | 369/112.08 |
| 2004/0008603 A1 | 1/2004 | Saitoh et al. | |
| 2008/0130467 A1 * | 6/2008 | Yamagata et al. ........ | 369/112.05 |

FOREIGN PATENT DOCUMENTS

JP        08-062493        3/1996

OTHER PUBLICATIONS

International Search Report and Written Opinion of the International Searching Authority issued on May 26, 2008, in counterpart International Application No. PCT/KR2008/000927 (11 pages).

* cited by examiner

*Primary Examiner* — Christopher R Lamb
(74) *Attorney, Agent, or Firm* — NSIP Law (57) ABSTRACT

A hologram optical device, a compatible optical pickup including the hologram optical device, and an optical information storage medium system including the compatible optical pickup are provided. The hologram optical device includes: a first hologram area having a hologram that is asymmetric with respect to an optical axis to diffract an incident light in a $0^{th}$ order diffractive light and a $1^{st}$ order diffractive light, wherein light spots are formed by focusing the $0^{th}$ order and $1^{st}$ order diffractive lights using a lens. Accordingly, a light spot of the $1^{st}$ order diffractive light is formed at a position separated from an optical axis of the lens when a light spot formed by the $0^{th}$ order diffractive light is formed on the optical axis of the lens.

37 Claims, 7 Drawing Sheets

HOLOGRAM OPTICAL DEVICE, COMPATIBLE OPTICAL PICKUP INCLUDING THE HOLOGRAM OPTICAL DEVICE, AND OPTICAL INFORMATION STORAGE MEDIUM SYSTEM INCLUDING THE COMPATIBLE OPTICAL PICKUP

CROSS-REFERENCE TO RELATED APPLICATION

This application claims the benefit of Korean Application No. 2007-33496 filed on Apr. 4, 2007, in the Korean Intellectual Property Office, the disclosure of which is incorporated herein by reference.

BACKGROUND OF THE INVENTION

1. Field of the Invention

Aspects of the present invention relate to a hologram optical device, a compatible optical pickup having the hologram optical device, and an optical information storage medium system including the compatible optical pickup, and more particularly, to a hologram optical device capable of reproducing and/or recording data from/to information storage media having different thicknesses using light emitted from the same light source, a compatible optical pickup having the hologram optical device, and an optical information storage medium system including the compatible optical pickup.

2. Description of the Related Art

The size of a spot of laser light focused on an information storage medium (i.e., an optical disc) via an objective lens determines the recording capacity of data on an optical recoding and/or reproducing apparatus. Specifically, the size of the optical spot is determined by the wavelength $\lambda$ of the laser light and numerical aperture (NA) of the objective lens according to the following Formula 1:

$$\text{Diameter of focused spot} \propto \lambda/NA \tag{1}$$

Thus, to reduce the size of the optical spot formed on an optical disc and thus achieve high density recording, it is necessary to employ a short wavelength light source (such as a blue laser) and an objective lens having a high NA.

According to the Blu-ray Disc (BD) standard, a single side of the BD has a storage capacity of about 25 GB. A recording/reproducing apparatus uses a light source having a wavelength of around 405 nm and an objective lens having an NA of 0.85 to record/reproduce data on the BD. The thickness of the BD is 0.1 mm. The thickness is defined as an interval from a light incident surface to an information storage surface, which also corresponds to the thickness of a protection layer.

Also, according to the high definition DVD (HD DVD) standard, the HD DVD has a storage capacity of about 15 GB. A recording/reproducing apparatus uses a light source having a wavelength of around 405 nm (the same as in the case of the BD) and an objective lens having an NA of 0.65 to record/reproduce data on the HD DVD. The thickness of the HD DVD is 0.6 mm. As with the BD, the thickness is defined as an interval from a light incident surface to an information storage surface, which also corresponds to the thickness of a substrate.

Due to the use of both the BD having a storage capacity of about 25 GB in a single side and the HD DVD having a storage capacity of about 15 GB in a single side, there is a need for a compatible apparatus that can use both types of optical discs in a single system. In this regard, a method of using two objective lenses appropriate for both types of optical discs has been suggested. However, in this case, since two objective lens units and corresponding optical parts are needed, the number of optical parts increases. Thus, the production cost increases. Furthermore, an optical axis adjustment between the objective lenses is difficult.

To address the above problems, a method of using one objective lens unit and reducing a spherical aberration using a hologram optical device has been considered. Japanese Patent Publication No. 08-062493 discloses a method of compatibly using CD based optical discs with a DVD light source by using a hologram lens. According to this method, in separating light, a $0^{th}$ order diffractive light as a straight transmission beam forms a focus and a $+1^{st}$ order diffractive light as a divergent transmission beam forms another focus having a different focus length. In the above publication, a hologram lens diffracts an incident light beam in the form of a parallel beam to a $0^{th}$ order diffractive light and a $+1^{st}$ order diffractive light. The $0^{th}$ order diffractive light is incident on the objective lens in the form of a non-divergent (non-convergent) beam. The incident beam is used to record information on a relatively thin optical disc or reproduce recorded information therefrom. Also, the $+1^{st}$ order diffractive light in the form of diverging beam is used to record information on a relatively thick optical disc or reproduce recorded information therefrom. The optical spot formed by the $0^{th}$ order diffractive light for recording and reproducing a DVD and the optical spot formed by the $+1^{st}$ order diffractive light for recording and reproducing a CD are formed on the same optical axis.

As described above, conventionally, the $0^{th}$ order diffractive light and the $+1^{st}$ order diffractive light are respectively used for straightly transmission and divergent transmission so as to record and reproduce not only a DVD, but also a CD with a DVD light source. However, even when the hologram optical device diffracts the incident light to the $0^{th}$ order light and the $+1^{st}$ order lights, the amount of light of each of the other orders is not completely zero. That is, the hologram optical device substantially diffracts a small amount of the incident light to other orders. Thus, the $0^{th}$ order diffractive light reflected by the optical disc and incident on the hologram lens is diffracted again by the hologram lens to the $0^{th}$ order light, the $+1^{st}$ order light, the $-1^{st}$ order light, and so forth. Here, the $0^{th}$ order diffractive light is used to detect a DVD reproduction signal. That is, for DVD reproduction, the $0^{th}$ order/$0^{th}$ order diffractive light is used as a signal light.

Likewise, the $1^{st}$ order diffractive light that is reflected by the optical disc and incident on the hologram lens is diffracted again by the hologram lens to the $0^{th}$ order light, the $+1^{st}$ order light, the $-1^{st}$ order light, and so forth. Here, the $+1^{st}$ order diffractive light is used for detecting a CD reproduction signal. That is, for CD reproduction, the $+1^{st}$ order/$+1^{st}$ order diffractive light is used as a signal light.

The signal light for the DVD reproduction uses the $0^{th}$ order diffractive light as an incident light and the $0^{th}$ order diffractive light reflected by the optical disc and incident on the hologram lens. The signal light for the CD reproduction uses the $+1^{st}$ order diffractive light as an incident light and the $+1^{st}$ order diffractive light reflected by the optical disc and incident on the hologram lens. When these signal lights are used for the compatible reproduction of the BD and HD DVD, the $0^{th}$ order/$0^{th}$ order diffractive light can be used as the signal light for the BD reproduction and the $1^{st}$ order/$1^{st}$ order diffractive light can be used as the signal light for the HD DVD reproduction.

However, when a general optical axis rotation symmetric hologram optical device such as the conventional hologram lens is used, the light spot for reproducing the BD and the light spot for reproducing the HD DVD exist on the same optical axis. Accordingly, the light detected by a photodetector after being reflected by the optical disc and passing through the hologram optical device includes noise due to other diffractive lights so that the reproduction signal is degraded. That is, when the hologram optical device uses the incident light of $n^{th}$ order diffractive light/the return light of $n^{th}$ order diffractive light as a signal light, the incident light of $(n-1)^{th}$ order diffractive light/the return light of $(n+1)^{th}$ order diffractive light, and the incident light of $(n+1)^{th}$ order diffractive light/the return light of $(n-1)^{th}$ order diffractive light are incident on the photodetector and acts as noise affecting the signal light. In this case, the incident light is light diffracted by the hologram optical device and emitted to the optical disc. The return light is light reflected by the optical disc, incident again on the hologram optical device to be diffracted, and proceeding toward the photodetector.

When a collimated parallel light from a light source is incident on a hologram optical device and a BD is employed, since the $0^{th}$ order diffractive light from the hologram optical device is reflected by the BD and incident again on the hologram optical device using an optical path of the $0^{th}$ order diffractive light, the $0^{th}$ order diffractive light of the hologram optical device proceeds as a parallel light after the hologram optical device. Also, since the $1^{st}$ order light from the hologram optical device is reflected by the BD and is incident again on the hologram optical device using an optical path of the $-1^{st}$ order diffractive light, eventually the $-1^{st}$ order diffractive light is incident on the hologram optical device and the light proceeds as a parallel light after the hologram optical device. Likewise, since the $-1^{st}$ order light from the hologram optical device is reflected by the optical disc and is incident again on the hologram optical device using an optical path of the $1^{st}$ order diffractive light, the light proceeds as a parallel light after passing through the hologram optical device.

When the BD is employed, the $0^{th}$ order/$0^{th}$ order diffractive light, the $-1^{st}$ order/$1^{st}$ order diffractive light, and the $1^{st}$ order/$-1^{st}$ order diffractive light proceed using the same optical path after the hologram optical device. Accordingly, when the $0^{th}$ order/$0^{th}$ order diffractive light is used as a signal light to reproduce the BD, the $-1^{st}$ order/$1^{st}$ order diffractive light and the $1^{st}$ order/$-1^{st}$ order diffractive light act as noise.

Figure 1:
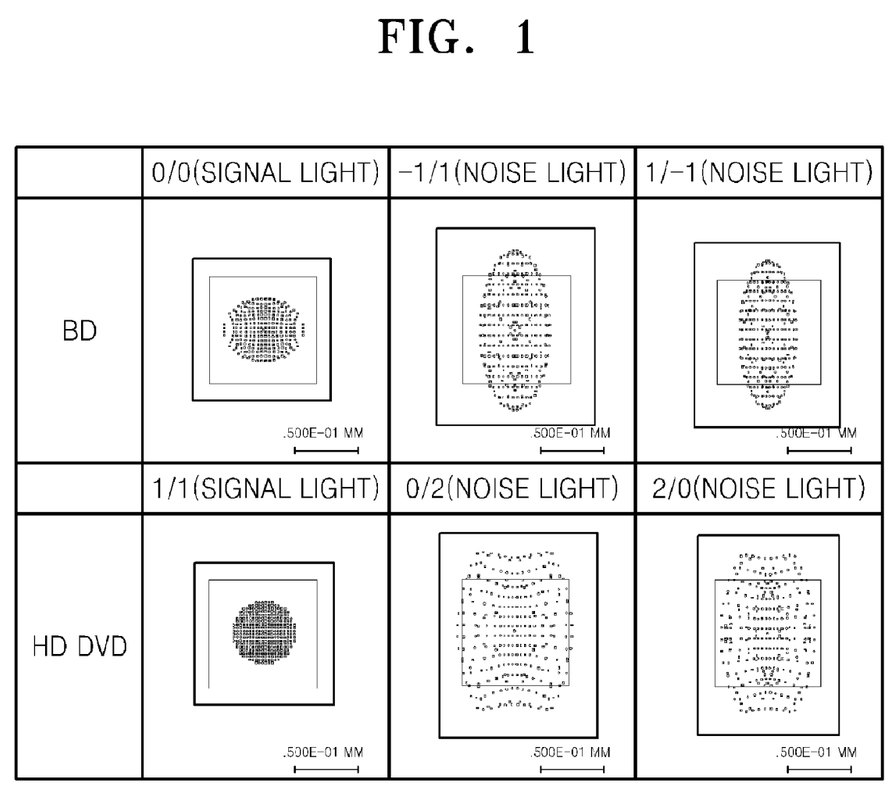
FIG. 1 illustrates spots of signal lights and noise lights received on a surface of a photodetector during the reproduction of a BD and an HD DVD.

Likewise, when the $1^{st}$ order/$1^{st}$ order diffractive light is used as a signal light for the HD DVD, the $0^{th}$ order/$2^{nd}$ order diffractive light and the $2^{nd}$ order/$0^{th}$ order diffractive light act as noise. As it can be seen from FIG. 1, the sizes of light spots formed on the photodetector by the $-1^{st}$ order/$1^{st}$ order diffractive light and the $1^{st}$ order/$-1^{st}$ order diffractive light and the $0^{th}$ order/$2^{nd}$ order diffractive light and the $2^{nd}$ order/$0^{th}$ order diffractive light are similar to that of the light spot formed by the signal light. As a result, a reproduction signal is degraded. FIG. 1 shows spots of a signal light and a noise light received on a surface of a photodetector during the reproduction of a BD and HD DVD. Thus, to increase the quality of the BD and HD DVD reproduction signal, noise should be reduced by reducing the efficiency of the diffractive light generating the noise.

Meanwhile, since the $0^{th}$ order/$1^{st}$ order and $1^{st}$ order/$0^{th}$ order diffractive lights having a high diffraction efficiency form a large spot on the photodetector, the $0^{th}$ order/$1^{st}$ order and $1^{st}$ order/$0^{th}$ order diffractive lights do not have much of an affect on the reproduction signal.

However, for an optical disc using a differential push-pull (DPP) signal as a tracking servo signal (such as a WORM and a re-recordable optical disc), the $-1^{st}$ order/$1^{st}$ order diffractive light, the $1^{st}$ order/$-1^{st}$ order diffractive light, the $0^{th}$ order/$2^{nd}$ order diffractive light, and the $2^{nd}$ order/$0^{th}$ order diffractive light are not the only lights that degrade a sub-push-pull (SPP) signal so that the DPP signal is degraded. The $0^{th}$ order/$1^{st}$ order and $1^{st}$ order/$0^{th}$ order diffractive lights also degrade the SPP signal so that the DPP signal is degraded. The reasons for this are as follows. Three light beams (a main light beam and two sub-light beams) divided by a grating for detection of the DPP signal form a light spot on the surface of an optical disc through an objective lens. In this case, the ratio of the amount of light between the main light beam and the sub-light beam is about 10:1. When a general optical axis rotation symmetric hologram optical device is used, the amount of light received in a sub-light receiving area for the detection of a sub-beam of the $1^{st}$ order/$0^{th}$ order and $0^{th}$ order/$1^{st}$ order diffractive lights of the main beam is large enough to affect the sub-push-pull signal.

SUMMARY OF THE INVENTION

Aspects of the present invention provide a hologram optical device that can secure the quality of a reproduction signal and prevent degradation of a sub-push-pull signal when a differential push-pull signal is used as a tracking servo signal for recording/reproducing information to/from optical information storage media having different thicknesses using the same light source, a compatible optical pickup having the hologram optical device, and an optical information storage medium system including the compatible optical pickup.

According to an aspect of the present invention, there is provided a hologram optical device provided in an optical pickup that includes an objective lens and a light source that emits an incident light along an optical axis, the hologram optical device including: a first hologram area including a hologram that is asymmetric with respect to the optical axis to diffract the incident light to a first $0^{th}$ order diffractive light and a first $1^{st}$ order diffractive light, wherein the objective lens focuses the first $0^{th}$ order diffractive light to form a first light spot on the optical axis and focuses the first $1^{st}$ order diffractive light to form a second light spot at a predetermined distance from the optical axis in a direction perpendicular to the optical axis.

According to another aspect of the present invention, there is provided a compatible optical pickup used with a first information storage medium in accordance with a first standard and a second information storage medium in accordance with a second standard and having a different thickness from the first information medium, the compatible optical pickup including: a light source to emit an incident light along an optical axis, the incident light having a predetermined wavelength; an objective lens to focus the incident light on an information storage medium, of the first information storage medium and the second information storage medium; and a hologram optical device including a first hologram area having a hologram that is asymmetric with respect to the optical axis to diffract the incident light to a first $0^{th}$ order diffractive light and a first $1^{st}$ order diffractive light, wherein the objective lens focuses the first $0^{th}$ order diffractive light to form a first light spot on the optical axis on the information storage medium and focuses the first $1^{st}$ order diffractive light to form a second light spot at a predetermined distance from the optical axis in a direction perpendicular to the optical axis.

According to another aspect of the present invention, the first hologram area of the hologram optical device may diverge the $1^{st}$ order diffractive light.

According to another aspect of the present invention, the hologram optical device may further include a second hologram area provided outside of the first hologram area and having a hologram to diffract the incident light to a second $0^{th}$ order diffractive light and a second $1^{st}$ diffractive light that converges.

According to another aspect of the present invention, in the hologram optical device, when the distance between a focused spot of the $1^{st}$ order diffractive light by the second hologram area and the optical axis of the lens is d1 and a distance between a focused spot of the $1^{st}$ order diffractive light by the first hologram area and the optical axis of the lens is d2, d1≠d2

According to another aspect of the present invention, in the second hologram area of the hologram optical device, a diffraction efficiency of the $0^{th}$ order diffractive light may be equal to or greater than that of the $1^{st}$ order diffractive light.

According to another aspect of the present invention, the hologram provided in the first hologram area may have concentric circles.

According to another aspect of the present invention, in the first hologram area, a diffraction efficiency of the $0^{th}$ order diffractive light may be equal to that of the $1^{st}$ order diffractive light.

According to another aspect of the present invention, the thickness of the first information storage medium may be 0.1 mm and the thickness of the second information storage medium may be 0.6 mm.

According to another aspect of the present invention, the first information storage medium may be in accordance with the BD (Blu-ray Disc) standard and the second information storage medium may be in accordance with the HD DVD (high definition DVD) standard.

According to another aspect of the present invention, the light source may emit a blue light having a wavelength in a range of 400 nm-420 nm.

According to another aspect of the present invention, the objective lens may have a first NA (numerical aperture) suitable for the first information storage medium in accordance with the first standard and the outermost diameter of the first hologram area of the hologram optical device when coupled to the objective lens is provided to make a second NA suitable for the second information storage medium in accordance with the second standard.

According to another aspect of the present invention, the first NA may be 0.85 and the second NA may be 0.65.

According to another aspect of the present invention, there is provided an optical information storage medium system including a compatible optical pickup used with a first information storage medium in accordance with a first standard and a second information storage medium in accordance with a second standard and having a different thickness from the first information storage medium, and a control portion controlling the compatible optical pickup, wherein the compatible optical pickup includes: a light source to emit an incident light along an optical axis, the incident light having a predetermined wavelength; an objective lens to focus the incident light on an information storage medium, of the first information storage medium and the second information storage medium; and a hologram optical device including a first hologram area having a hologram that is asymmetric with respect to the optical axis to diffract the incident light to a first $0^{th}$ order diffractive light and a first $1^{st}$ order diffractive light, wherein the objective lens focuses the first $0^{th}$ order diffractive light to form a first light spot on the optical axis on the information storage medium and focuses the first $1^{st}$ order diffractive light to form a second light spot at a predetermined distance from the optical axis in a direction perpendicular to the optical axis.

According to another aspect of the present invention, there is provided a method of recording/reproducing data, with one compatible optical pickup, on a first information storage medium in accordance with a first standard and a second information storage medium in accordance with a second standard, the first information storage medium and the second information storage medium having difference thicknesses, the method including: emitting an incident light along an optical axis, the incident light having a predetermined wavelength; diffracting the incident light with a first hologram that is asymmetric with respect to the optical axis, the incident light diffracted to a first $0^{th}$ order diffractive light and a first $1^{st}$ order diffractive light; focusing the first $0^{th}$ order diffractive light to form a first light spot on the optical axis on an information storage medium, of the first information storage medium and the second information storage medium; and focusing the first $1^{st}$ order diffractive light to form a second light spot on the information storage medium at a predetermined distance from the optical axis in a direction perpendicular to the optical axis.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
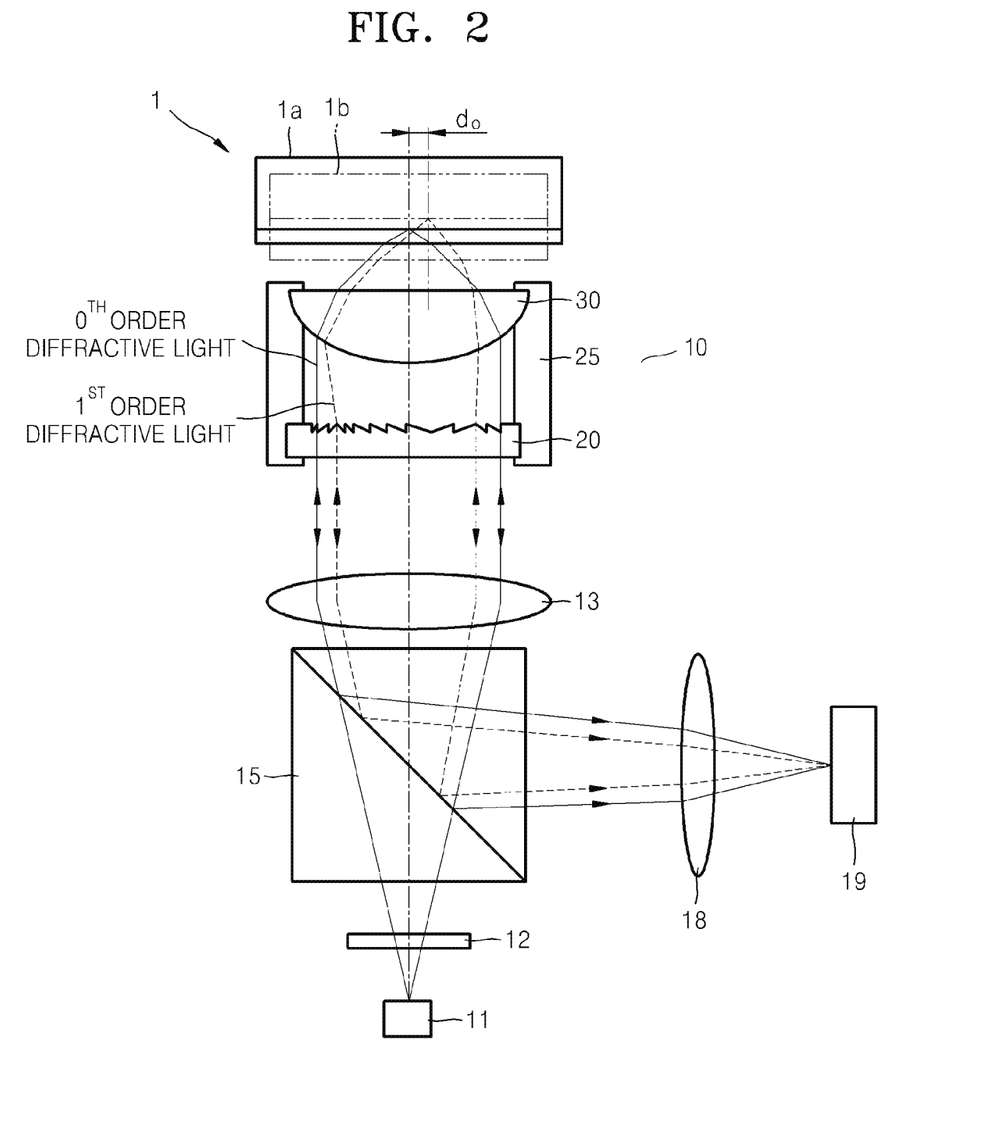
FIG. 2 illustrates the optical configuration of a compatible optical pickup including the hologram optical device according to an embodiment of the present invention.

FIG. 2 illustrates the optical configuration of a compatible optical pickup 10 including a hologram optical device 20 according to an embodiment of the present invention. According to aspects of the present invention, the compatible optical pickup 10 can record/reproduce data on both a first information storage medium 1a in accordance with a first standard and a second information storage medium 1b in accordance with a second standard. Referring to FIG. 2, the compatible optical pickup 10 includes a light source 11 to emit light of a predetermined wavelength, a hologram optical device 20 having a first hologram area 21 (illustrated in FIGS. 3A and 3B) to diffract incident light emitted from the light source 11 to a $0^{th}$ order diffractive light that proceeds straight, and a $1^{st}$ order diffractive light that diverges. An objective lens 30 has a first numerical aperture (NA) to focus the incident light on an information storage medium 1 and is optimized/appropriate for the first information storage medium 1a in accordance with the first standard, but is usable with the information storage medium 1b. An optical path changer 15 is arranged on an optical path between the light source 11 and the objective lens 30 to change a proceeding path of the incident light. A photodetector 19 receives light that is reflected by the information storage medium 1 and passes through the objective lens 30 and the optical path changer 15.

The first and second information storage media 1a and 1b have different thicknesses and can be used in conjunction with light having the same wavelength. For example, the thickness of the first information storage medium 1a may be 0.1 mm while the thickness of the second information storage medium 1b may be 0.6 mm. Also, the first information storage medium 1a may be in accordance with the BD standard while the second information storage medium 1b may be in accordance with the HD DVD standard. It is understood that aspects of the present invention may be applied to other optical media standards as well.

The light source 11 emits light having a wavelength commonly used for the first information storage medium 1a in accordance with the first standard (for example, a BD standard) and the second information storage medium 1b in accordance with the second standard (for example, an HD DVD standard). For example, when the first and second information storage media 1a and 1b are a BD and an HD DVD, respectively, the light source 11 emits a blue light within a range of 400-420 nm (such as about 405 nm). A semiconductor laser emitting a blue light can be provided as the light source 11, although not limited thereto.

A collimating lens 13 to collimate a divergent light emitted from the light source 11 into a parallel light is further provided on an optical path between the light source 11 and the objective lens 30. FIG. 2 illustrates an example of the arrangement of the collimating lens 13 between the optical path changer 15 and the hologram optical device 20. Also, a sensor lens 18 to receive the light reflected by the information storage medium 1 and to form a light spot of an appropriate size on the photodetector 19 is further provided on the optical path between the optical path changer 15 and the photodetector 19. The sensor lens 18 may be an astigmatism lens such that a focus error signal can be detected using an astigmatism method. The optical path changer 15 may, although not necessarily, include a general beam splitter. Alternatively, the optical path changer 15 may include a polarization beam splitter and a quarter wave plate.

Figure 4:
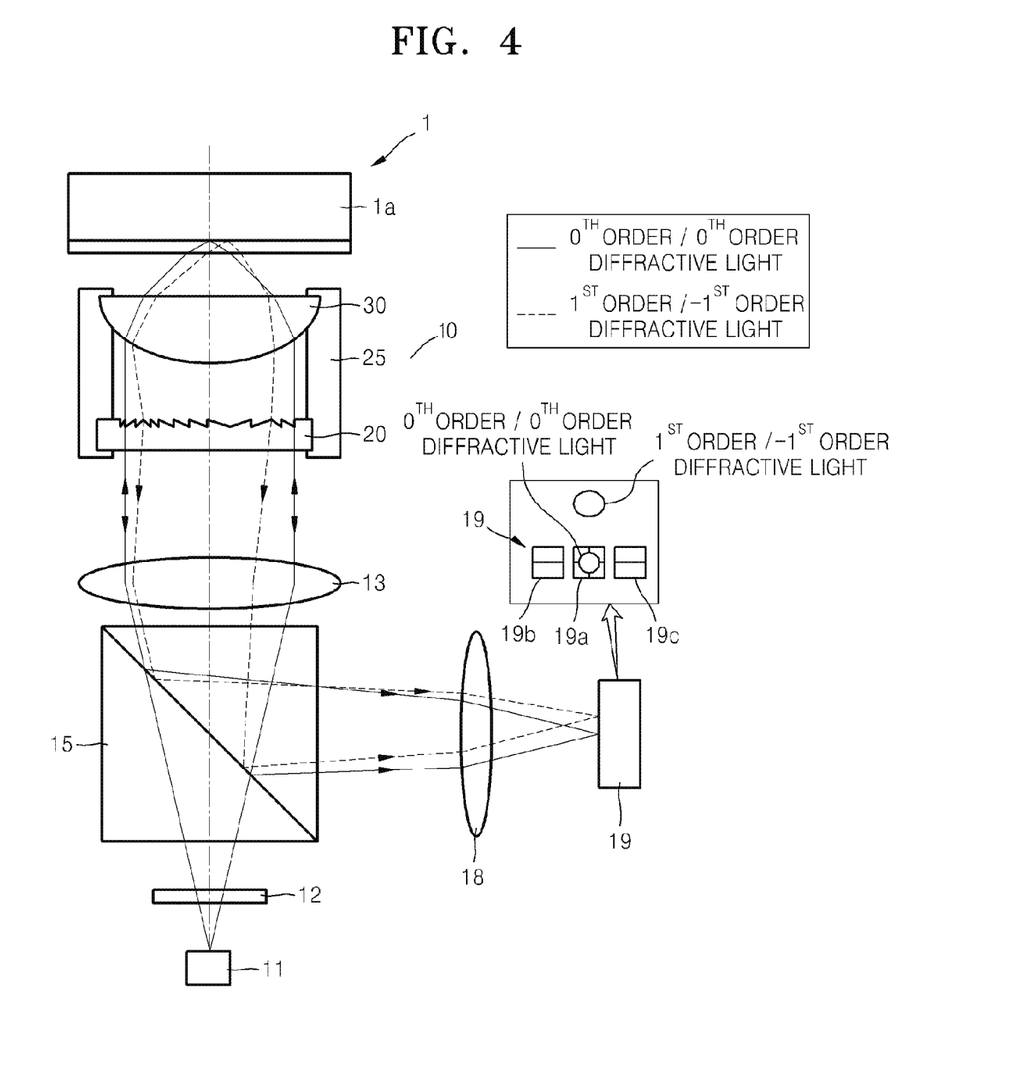
FIG. 4 illustrates the optical paths through which the $0^{th}$ order/$0^{th}$ order diffractive light and the $1^{st}$ order/$-1^{st}$ order diffractive light pass and arrive at the photodetector in a compatible optical pickup according to an embodiment of the present invention.
Figure 6A:
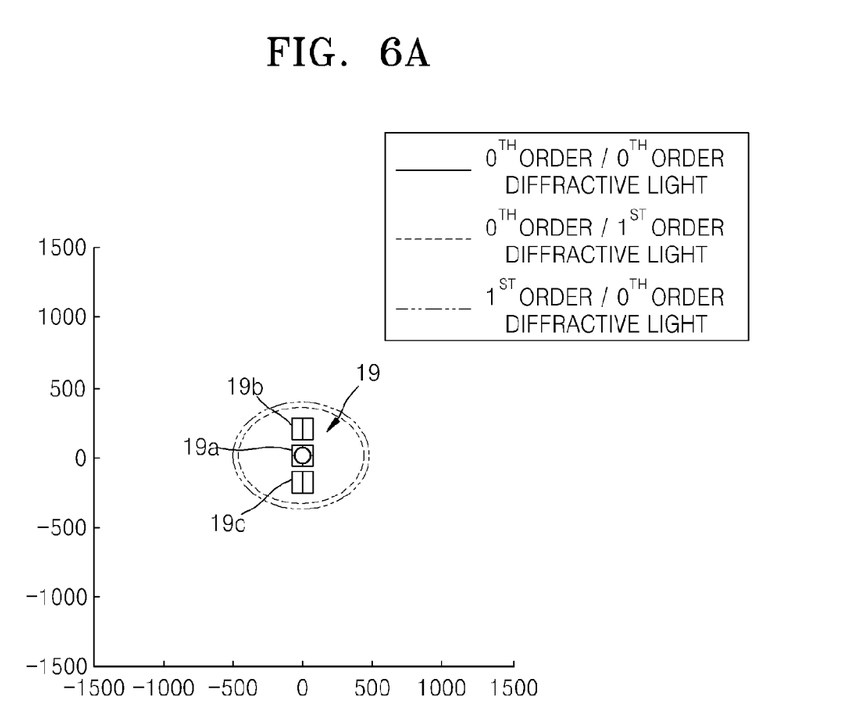
FIG. 6A illustrates light spots of the $0^{th}$ order/$0^{th}$ order diffractive light, the $0^{th}$ order/$1^{st}$ order diffractive light, and the $1^{st}$ order/$0^{th}$ order diffractive light received by the photodetector when the conventional hologram optical device of FIG. 5B is used.
Figure 6B:
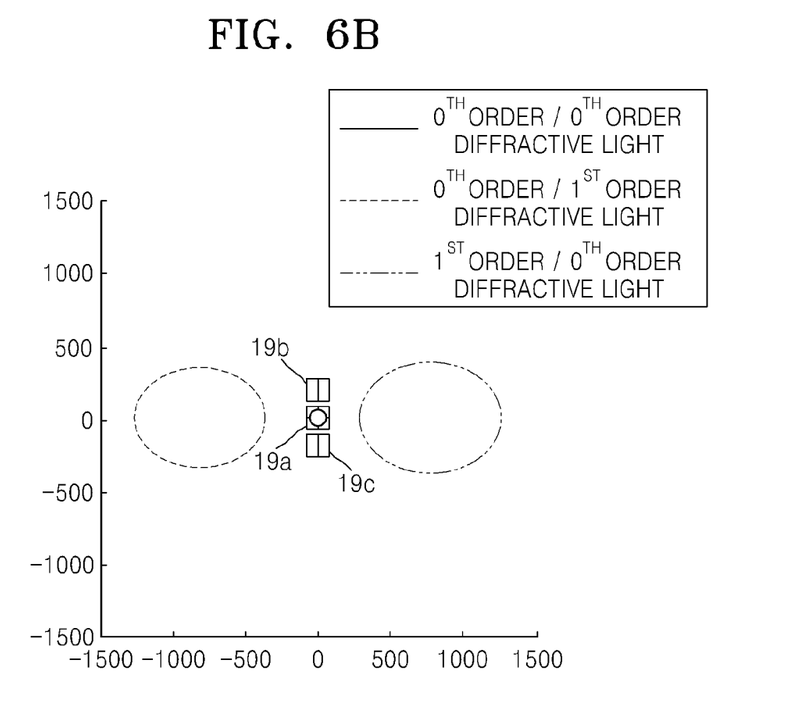
FIG. 6B illustrates light spots of the $0^{th}$ order/$0^{th}$ order diffractive light, the $0^{th}$ order/$1^{st}$ order diffractive light, and the $1^{st}$ order/$0^{th}$ order diffractive light received by the photodetector when the hologram optical device according to aspects of the present invention is used.

To detect a track servo signal in a 3-beam method or a differential push-pull (DPP) method, the compatible optical pickup 10 further includes a grating 12 that is provided on the optical path between the light source 11 and the optical path changer 15 to split the light output from the light source 11 into three light beams (i.e., a main light beam and two sub-light beams). In this case, as shown in FIGS. 4 and 6, the photodetector 19 may include a light receiving area 19a to receive the main light beam and light receiving areas 19b and 19c to receive the two sub-light beams. The light receiving area 19a to detect the main light beam includes, for example, four divided light receiving areas, as shown in FIGS. 4 and 6. The light receiving areas 19b and 19c to detect the sub-light beams include, for example, two divided light receiving areas, as shown in FIGS. 4 and 6. In this case, a tracking servo signal can be detected using the differential push-pull method and/or a 3-beam method. When the compatible optical pickup 10 detects the tracking servo signal using the 3-beam method, the light receiving areas 19b and 19c may include only a single light receiving area. In FIGS. 2, 4, and 6, the illustration of the sub-light beam is omitted for the clear illustration of the characteristic portions of aspects of the present invention. Since the detection of a tracking servo signal in the differential push-pull method or 3-beam method is well known in the technical field to which aspects of the present invention pertain, detailed descriptions and illustrations thereof are omitted herein.

The hologram optical device 20 is fixedly arranged to be a predetermined distance from the objective lens 30 by a support member 25.

Figure 3A:
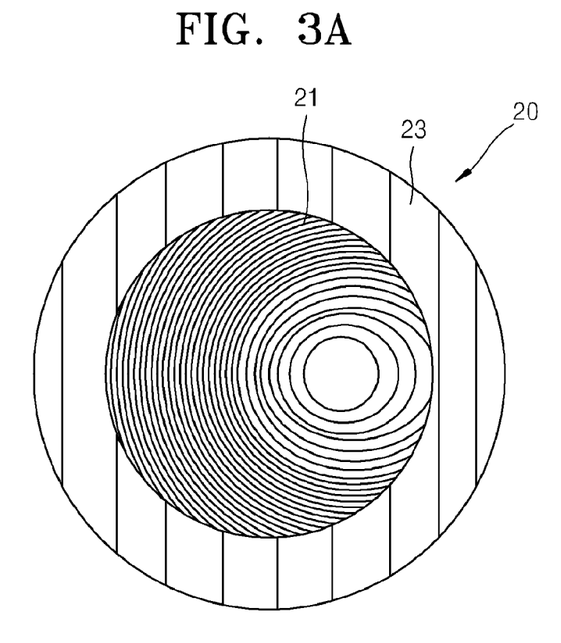
FIGS. 3A and 3B are plan views of hologram optical devices according to embodiments of the present invention.
Figure 3B:
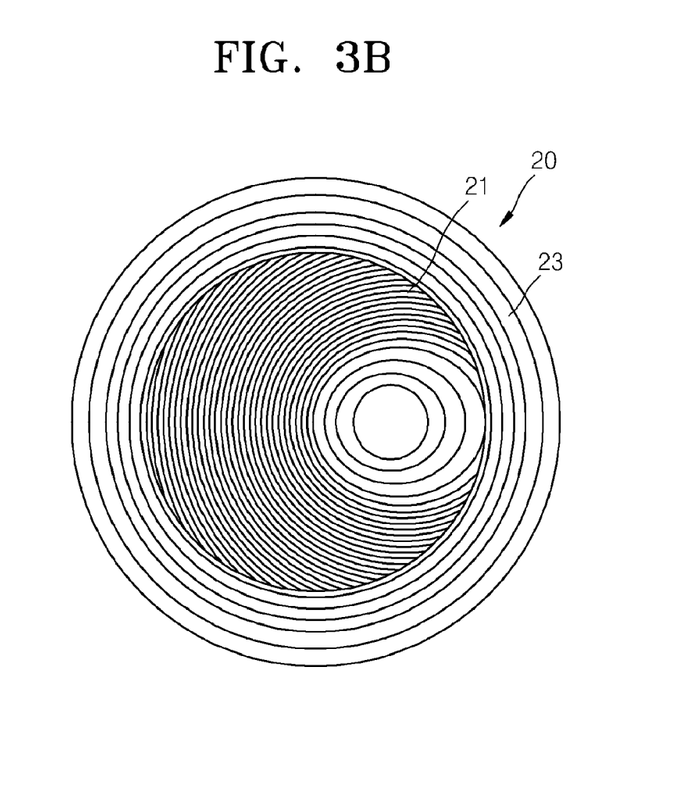

FIGS. 3A and 3B are plan views showing hologram optical devices 20 according to embodiments of the present invention. Referring to FIGS. 3A and 3B, the first hologram area 21 of the hologram optical device 20 includes an optical axis rotation asymmetric phase type hologram. The phase type hologram, for example, can be formed in a step pattern or kinoform pattern. Accordingly, the first hologram area 21 diffracts the incident light to the $0^{th}$ order diffractive light that proceeds straight and the $1^{st}$ diffractive light that diverges. The first hologram area 21 forms a $0^{th}$ order diffractive light spot on the optical path of the objective lens 30 and forms a $1^{st}$ order diffractive light spot at a position separated by d0 (illustrated in FIG. 2) from the optical axis of the objective lens 30 in a direction perpendicular to the optical axis. The first hologram area 21 forms the light spots by focusing the $0^{th}$ order diffractive light and the $1^{st}$ order diffractive light using a predetermined lens (for example, the objective lens 30 of FIG. 2).

The first hologram area 21 may be provided such that the efficiencies of the diffractions by the $0^{th}$ order diffractive light and the $1^{st}$ order diffractive light are approximately equal to each other. For example, the first hologram area 21 may be provided such that the diffraction efficiencies of the $0^{th}$ order diffractive light, the $1^{st}$ order diffractive light, the $-1^{st}$ order diffractive light, and the $2^{nd}$ order diffractive light are 38.3%, 38.3%, 5.8%, and 3.0%, respectively. However, it is understood that according to aspects of the present invention, the first hologram area 21 is provided to diffract the incident light mainly to the $0^{th}$ order and the $1^{st}$ order diffractive lights irrespective of whether the diffraction efficiency values are approximately equal.

The first hologram area 21 may be provided to make a second NA suitable for the second information storage medium 1b in accordance with the second standard (for example, the HD DVD standard), when the outermost diameter of the first hologram area 21 is coupled to the objective lens 30. The first NA may be 0.85 and the second NA may be 0.65. However, it is understood that aspects of the present invention are not limited thereto.

As shown in FIG. 1, a BD entrance pupil, which is an effective light range for the BD that can achieve the first NA of 0.85, is larger than an HD DVD entrance pupil, which is an effective light range for the HD DVD that can achieve the second NA of 0.65. Thus, 0.65. Thus, when the hologram optical device 20 only includes the first hologram area 21 that corresponds to the size of the HD DVD entrance pupil, the ratio of the $0^{th}$ order diffractive light and the $1^{st}$ order diffractive light can be adjusted in the HD DVD entrance pupil. However, the incident light completely passes through a ring shaped area that is outside of the HD DVD entrance pupil and belongs to the BD entrance pupil. Thus, the transmission efficiency in the hologram optical device 20 in the overall area of the BD entrance pupil is not uniform, resulting in jitter degradation.

Thus, as shown in FIGS. 2, 3A, and 3B, by forming a hologram in the ring shaped area to converge and transmit the $1^{st}$ order diffractive light, the $1^{st}$ order diffractive light is scattered so as to not affect the recording surface of the information storage medium 1. Furthermore, the $0^{th}$ order diffractive light has a transmission efficiency that is approximately equal to that of the $0^{th}$ order diffractive light in the area corresponding to the size of the HD DVD entrance pupil so that an approximately equal transmission efficiency can be obtained over the overall area of the BD entrance pupil, thus preventing the jitter degradation.

The hologram optical device 20 according to the embodiments shown in FIGS. 2, 3A, and 3B, further includes a second hologram area 23 that is provided outside of the first hologram area 21. The second hologram area 23 includes a hologram that diffracts incident light to the $0^{th}$ order diffractive light that proceeds straight and the $1^{st}$ order diffractive light that converges. The second hologram area 23 makes the transmission rate of a beam suitable for the first information storage medium 1a more uniform than that in the overall area corresponding to the size of the entrance pupil corresponding to the first NA.

The second hologram area 23 diffracts the incident light to the $0^{th}$ order and the $1^{st}$ order diffractive lights and converges the $1^{st}$ order diffractive light. A hologram having the same depth as that of the hologram of the first hologram area 21 may be provided in the second hologram area 23. The $1^{st}$ order diffractive light diffracted by the second hologram area 25 is focused at a position before the information storage surface of the first information storage medium 1a (for example, a BD), and thus is not focused substantially on the information storage surface.

FIG. 3A illustrates an example of the second hologram area 23 including a hologram of a stripe pattern. FIG. 3B illustrates an example of the second hologram area 23 including a hologram of a concentric circular pattern. It is understood that the hologram of the first hologram area 21 may also be of a stripe pattern or a concentric circular pattern. Since the second hologram area 23 is used only for forming a focused spot on the first information storage medium 1a that is thin, a pattern similar to the hologram pattern of the first hologram area 21 is not required. Any hologram pattern capable of controlling the efficiency of the $0^{th}$ order diffraction can be used regardless of the pattern shape of the second hologram area 23. Therefore, the pattern can be variously modified.

In the compatible optical pickup 10 including the hologram optical device 20 according to aspects of the present invention, the $0^{th}$ order diffractive light passing through the first and second hologram areas 21 and 23 is used for recording/reproducing data on the first information storage medium 1a that is thin (for example, a BD). Furthermore, the $1^{st}$ order diffractive light diffracted by the first hologram area 21 is used for recording/reproducing data on the second information storage medium 1b, which is thicker than the first information storage medium 1b (for example, an HD DVD). Thus, since the second hologram area 23 is to make, for example, the $0^{th}$ order diffractive light passing through the hologram optical device 20 more uniform in the overall area of the BD entrance pupil, the second hologram area 23 may be provided such that the diffraction efficiency of the $1^{st}$ order and $0^{th}$ order diffractive lights are equal to each other. However, it is understood that aspects of the present invention are not limited thereto. For example, the second hologram area 23 may be provided such that the diffraction efficiency of the $0^{th}$ order diffractive light is greater than that of the $1^{st}$ diffractive light.

While not required in all aspects, the hologram optical device 20 satisfies the following conditions. When the $1^{st}$ order diffractive light by the second hologram area 23 is focused on the second information storage medium 1b that is thick, it is assumed that the distance (decenter distance) that the focused spot is separated from the optical axis of the objective lens 30, in a direction perpendicular to the optical axis, is d1. When the $1^{st}$ order diffractive light by the first hologram area 21 is focused on the second information storage medium 1b, it is assumed that the distance (decenter distance) of the focused spot separated in a direction perpendicular to the optical axis of the objective lens 30 is d2. In this case, d1 may not be equal to d2.

When the second hologram area 23 includes a hologram of the stripe pattern as shown in FIG. 3A, since d1 is a value other than 0, a hologram pattern that satisfies the condition d1≠d2 may be provided in the first and second hologram areas 21 and 23. When the second hologram area 23 includes a hologram of the concentric circular pattern as shown in FIG. 3B, since d1=0, the hologram optical device 20 naturally satisfies the condition d1≠d2.

When the hologram optical device 20 is provided to satisfy the condition d1≠d2, during the reproduction of the second information storage medium 1b, even when the $1^{st}$ order diffractive light that converges after being diffracted by the second hologram area 23 is reflected by the information storage medium 1 and passes through the first hologram area 21, the light is prevented from being received in an effective light receiving area of the photodetector 19.

The hologram optical device 20 according to aspects of the present invention is an optical axis rotation asymmetric phase type hologram diffraction optical device and can form a light spot by the $0^{th}$ order diffractive light (for example, a BD signal light) on the optical axis of the objective lens 30 and a light spot by the $1^{st}$ order diffractive light (for example, an HD DVD signal light) by decentering the light spot in a direction perpendicular to the optical axis of the objective lens 30 (for example, in a radial direction). Thus, the incident light of $-1^{st}$ order diffractive light/return light of $1^{st}$ order diffractive light and the incident light of $1^{st}$ order diffractive light/return light of $-1^{st}$ order diffractive light that degrade the BD reproduction signal, the incident light of $0^{th}$ order diffractive light/return light of $2^{nd}$ order diffractive light and the incident light of $2^{nd}$ order diffractive light/return light of $0^{th}$ order diffractive light that degrade the HD DVD reproduction signal, and the incident light of $0^{th}$ order diffractive light/return light of $1^{st}$ order diffractive light and the incident light of $1^{st}$ order diffractive light/return light of $0^{th}$ order diffractive light that degrade the servo signal can be prevented from being received in the effective light receiving area of the photodetector 19 and formed far from the center of the photodetector 19. Thus, noise formed by a non-signal diffractive light can be removed so that the BD/HD DVD reproduction signal characteristic and the tracking servo signal characteristic when using the differential push-pull method can be greatly improved.

The removal of a noise diffractive light, which degrades a reproduction signal or servo signal, with the hologram optical device 20 according to aspects of the present invention is described below.

Figure 5A:
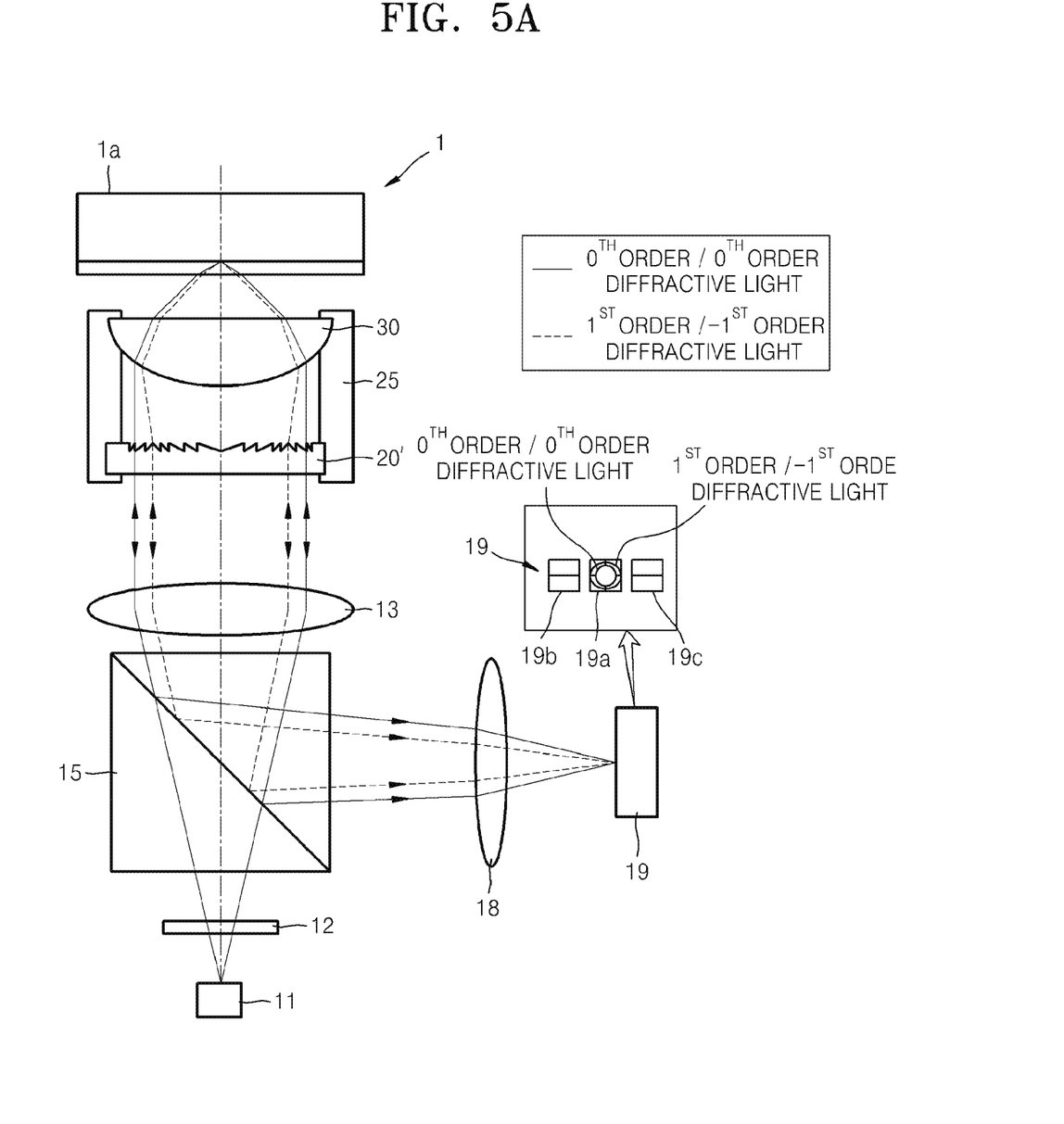
FIG. 5A illustrates, as a comparative example, the optical paths through which the $0^{th}$ order/$0^{th}$ order diffractive light and the $1^{st}$ order/$-1^{st}$ order diffractive light pass and arrive at the photodetector when a conventional optical axis rotation symmetric hologram optical device is used for the compatible optical pickup instead of the hologram optical device according to the present invention.
Figure 5B:
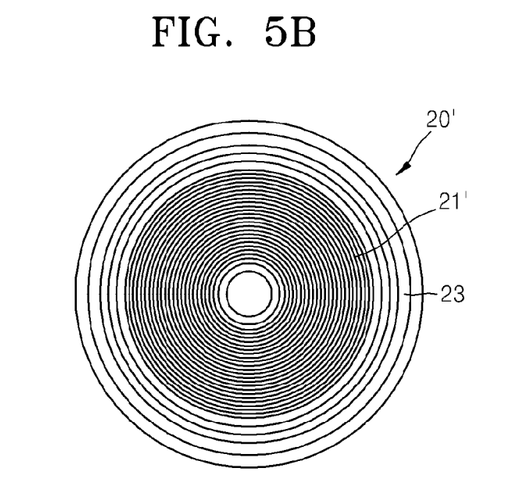
FIG. 5B is a plan view of the conventional optical axis rotation symmetric hologram optical device of FIG. 5A.

FIG. 4 illustrates the optical paths through which the $0^{th}$ order/$0^{th}$ order diffractive light and the $1^{st}$ order/$-1^{st}$ order diffractive light pass and arrive at the photodetector in a compatible optical pickup 10 according to an embodiment of the present invention. FIG. 5A illustrates, as a comparative example, the optical paths through which the $0^{th}$ order/$0^{th}$ order diffractive light and the $1^{st}$ order/$-1^{st}$ order diffractive light pass and arrive at the photodetector when a conventional optical axis rotation symmetric hologram optical device 20' is used as the compatible optical pickup instead of the hologram optical device 20 according to aspects of the present invention. FIG. 5B is a plan view of the conventional optical axis rotation symmetric hologram optical device 20' of FIG. 5A.

As shown in FIG. 5A, when the conventional optical axis rotation symmetric hologram optical device 20' is used, during the reproduction of the first information storage medium 1a (for example, the BD) using the $0^{th}$ order/$0^{th}$ order diffractive light, the $1^{st}$ order/$-1^{st}$ order diffractive light arrives at the same position on the photodetector 19. In contrast, as shown in FIG. 4, when the hologram optical device 20 according to aspects of the present invention is used, the focused spot of the $1^{st}$ order diffractive light is decentered in the radial direction of the first information storage medium 1a perpendicular to the optical axis. Thus, when the hologram optical device 20 according to aspects of the present invention is used, during the reproduction of, for example, a BD using the $0^{th}$ order/$0^{th}$ order diffractive light, since the $1^{st}$ order/$-1^{st}$ order diffractive light arrives at the photodetector 19 by being decentered from the arrival position of the $0^{th}$ order/$0^{th}$ order diffractive light, the $1^{st}$ order/$-1^{st}$ order diffractive light noise can be removed. Likewise, the $0^{th}$ order/$2^{nd}$ order diffractive light and the $2^{nd}$ order/$0^{th}$ order diffractive light noise can be removed during, for example, the reproduction of an HD DVD. Thus, by using the hologram optical device 20 according to aspects of the present invention, the diffractive light noise that degrades the reproduction signals of, for example, the BD and the HD DVD can be removed.

According to aspects of the present invention, when the focused spot of the $0^{th}$ order diffractive light is formed on the optical axis and the focused spot of the $1^{st}$ order diffractive light is decentered on the information storage medium 1 by the hologram optical device 20 in a direction perpendicular to the optical axis, the absolute decentering amount of the incident light of $n^{th}$ order/return light of $m^{th}$ order diffractive light from the center of the photodetector 19 can be approximately calculated as follows. It is assumed that the distance between the focused spot of the $1^{st}$ order diffractive light decentered from the optical axis in a direction perpendicular to the optical axis on the information storage medium 1 is d0, the distance of the incident light of $n^{th}$ order/return light of $M^{th}$ diffractive light decentered from the center of the photodetector 19 is d1, and a lateral magnification designed in the compatible optical pickup 10 according to aspects of the present invention is M. The distance d1 of the incident light of $n^{th}$ order diffractive light/return light of $m^{th}$ diffractive light decentered from the center of the photodetector 19 is as shown in the following Formulas 2 and 3:

When $n=m$, $d1=0$ (2)

When $n \neq M$, $d1=abs(n-m) \times d0 \times M$ (3)

where the lateral magnification M is the ratio f2/f1 of the focal length f2 of the sensor lens 18 with respect to the focal length f1 of the objective lens 30.

FIG. 6A illustrates light spots of the $0^{th}$ order/$0^{th}$ order diffractive light, the $0^{th}$ order/$1^{st}$ order diffractive light, and the $1^{st}$ order/$0^{th}$ order diffractive light received by the photodetector 19 when the conventional hologram optical device 20' of FIG. 5B is used. FIG. 6B illustrates light spots of the $0^{th}$ order/$0^{th}$ order diffractive light, the $0^{th}$ order/$1^{st}$ order diffractive light, and the $1^{st}$ order/$0^{th}$ order diffractive light received by the photodetector 19 when the hologram optical device 20 according to aspects of the present invention is used.

When the conventional hologram optical device 20' is used (as shown in FIG. 6A), the $0^{th}$ order/$1^{st}$ order diffractive light and the $1^{st}$ order/$0^{th}$ order diffractive light form large light spots with respect to the center of the photodetector. The $1^{st}$ order/$0^{th}$ order diffractive light and the $0^{th}$ order/the $1^{st}$ order diffractive light hardly affect a reproduction signal during the reproduction of a BD, but causes degradation of a sub-push-pull signal of a DPP signal.

Since the ratio of the amount of light between the main light beam and the sub-light beam split by the grating 12 for the detection of the DPP signal is about 10:1, when the conventional optical axis rotation symmetric hologram optical device 20' is used (as shown in FIG. 6), the $0^{th}$ order/$1^{st}$ order diffractive light and the $1^{st}$ order/$0^{th}$ order diffractive light forming large light spots with respect to the center of the photodetector 19 are sufficiently detected to affect the sub-push-pull signal in the sub-light receiving areas 19b and 19c. Accordingly, when the conventional optical axis rotation symmetric hologram optical device 20' is used, the sub-push-pull signal of the DPP is degraded when the information storage medium using a tracking servo DPP is reproduced.

In contrast, when the hologram optical device 20 according to aspects of the present invention is used, the $0^{th}$ order/$1^{st}$ order diffractive light and the $1^{st}$ order/$0^{th}$ order diffractive light form large light spots at positions deviated from the center of the photodetector 19. Thus, the $0^{th}$ order/$1^{st}$ order diffractive light and the $1^{st}$ order/$0^{th}$ order diffractive light are hardly received in the sub-light receiving areas 19b and 19c, and degradation to the sub-push-pull signal is reduced or eliminated.

FIGS. 6A and 6B shows examples of the sizes the light spots formed according to the diffractive lights detected by the photodetector 19 when the conventional hologram optical device 20' and the hologram optical device 20 according to aspects of the present invention are used. When the hologram optical device 20 according to aspects of the present invention is used, the size d0 of the light spot in FIG. 6B is about 30 μm and the lateral magnification M is about 30, which are obtained when a coefficient of a phase profile φ of the hologram optical device 20 according to aspects of the present invention satisfies the following Table 1:

| C1 | 0.00935 | C23 | 0.000802417 | C45 | 2.58E−05 |
|---|---|---|---|---|---|
| C2 | 0 | C24 | 0 | C46 | 0 |
| C3 | 0.008604948 | C25 | 0.000861574 | C47 | 0.000110809 |
| C4 | 0 | C26 | 0 | C48 | 0 |
| C5 | 0.008638046 | C27 | 0.000356647 | C49 | 0.000179156 |
| C6 | −0.000275018 | C28 | −0.000170566 | C50 | 2.63E−05 |
| C7 | −3.88E−05 | C29 | 0 | C51 | 0.000120869 |
| C8 | −0.000282749 | C30 | −0.00053363 | C52 | 1.71E−05 |
| C9 | −2.74E−05 | C31 | −4.32E−05 | C53 | 2.73E−05 |
| C10 | −0.000893598 | C32 | −0.000556282 | C54 | 0 |
| C11 | 0 | C33 | −7.14E−05 | C55 | 3.65E−05 |
| C12 | −0.001811142 | C34 | −0.000178316 | C56 | 0 |

-continued

| | | | | | |
|---|---|---|---|---|---|
| C13 | 0 | C35 | -3.00E-06 | C57 | 0.000150249 |
| C14 | -0.000975022 | C36 | -0.000236949 | C58 | 0 |
| C15 | 0.000348923 | C37 | 0 | C59 | 0.000349197 |
| C16 | 0 | C38 | -0.000842548 | C60 | 0 |
| C17 | 0.000720162 | C39 | 0 | C61 | 0.000358451 |
| C18 | 5.26E-05 | C40 | -0.001381722 | C62 | 0 |
| C19 | 0.000362666 | C41 | 0 | C63 | 0.000161105 |
| C20 | -2.65E-06 | C42 | -0.000888663 | C64 | 0 |
| C21 | 0.000293021 | C43 | 0 | C65 | 4.08E-05 |
| C22 | 0 | C44 | -0.000262734 | | |

$$\phi = \sum_m \sum_n C_N x^m y^n, \text{ where } N = 0.5[(m+n)^2 + m + 3n]$$

The amount of noise entering the sub-push-pull signal can be calculated using the ratio of the amount of light of the sub-beam, the size of a light spot of the sub-beam, the amount of noise refractive light, and the size of a spot formed by the noise refractive light. When the amount of noise is calculated based, for example, on the BD single layer (SL), it can be seen that 35% noise of the sub-push-pull signal in the case of using the conventional hologram optical device 20' is completely removed using the hologram optical device 20 according to aspects of the present invention. Thus, when the hologram optical device 20 according to aspects of the present invention is used, the degradation of the sub-push-pull signal of the differential push-pull signal due to the $1^{st}$ order/$0^{th}$ order diffractive light and the $0^{th}$ order/$1^{st}$ order diffractive light can be prevented.

Figure 7:
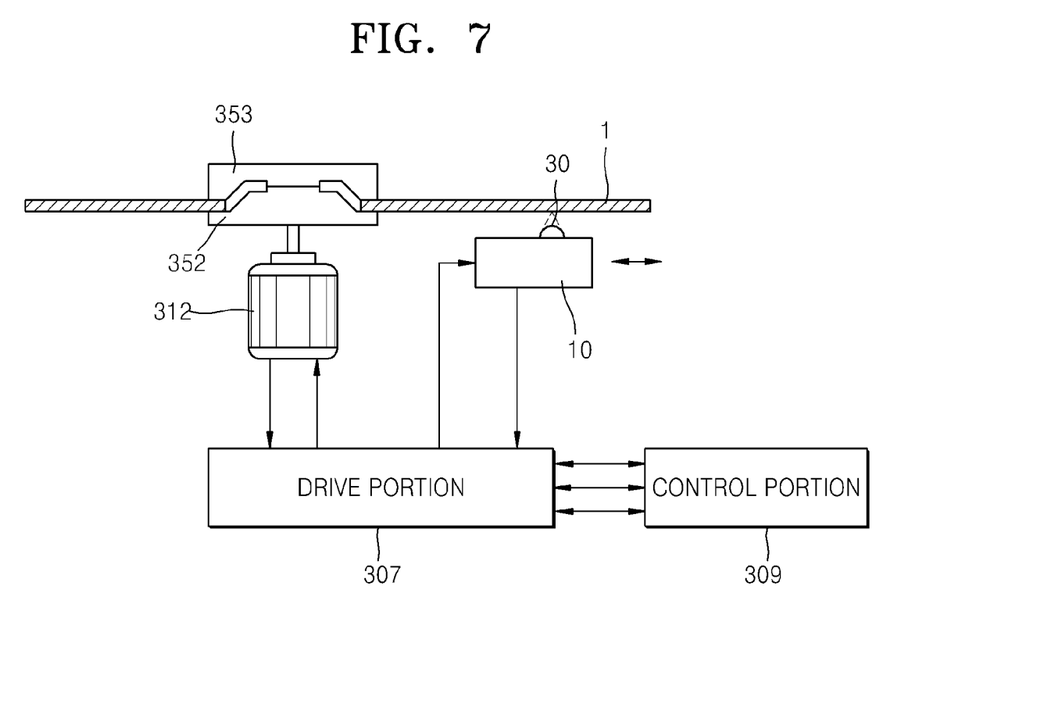
FIG. 7 illustrates the structure of an optical recording and/or reproducing apparatus including the compatible optical pickup according to an embodiment of the present invention.

FIG. 7 illustrates the structure of an optical recording and/or reproducing apparatus including the compatible optical pickup according to an embodiment of the present invention. The optical recording and/or reproducing apparatus includes a spindle motor 312 to rotate an information storage medium 1, a compatible optical pickup 10 according to aspects of the present invention that is capable of moving in the radial direction of the information storage medium 1 to reproduce and/or record information on the information storage medium 1, a drive portion 307 to drive the spindle motor 312 and the compatible optical pickup 10, and a control portion 309 to control focus, tracking, and/or tilt servo of an optical pickup 30. The optical recording and/or reproducing apparatus further includes a turntable 352 and a clamp 353 to chuck the information storage medium 1.

The light reflected by the information storage medium 1 is detected by the photodetector 19 provided in the compatible optical pickup 10 and converted to an electric signal through a photoelectric conversion. The electric signal is input to the control portion 309 through the drive portion 307. The drive portion 307 controls the rotation speed of the spindle motor 312, amplifies an input signal, and drives the compatible optical pickup 10. The control portion 309 sends, to the drive portion 307, a focus servo command, a tracking servo command, and/or a tilt servo command adjusted based on the signal output from the drive portion 307 so that the focusing, tracking, and or tilt operations of the compatible optical pickup 10 can be performed. Thus, the optical recording and/or reproducing apparatus including the compatible optical pickup 10 according to aspects of the present invention can use both a BD and an HD DVD.

As described above, according to aspects of the present invention, there is provided an objective lens group using a single light source and capable of recording/reproducing information storage media having different thicknesses in accordance with different standards (for example, a BD and an HD DVD) by combining a hologram optical device to an objective lens.

According to aspects of the present invention, there is provided an optical axis rotation asymmetric phase type hologram diffractive optical device that forms a light spot on the optical axis on an information storage medium that is thin in the case of the $0^{th}$ order diffractive light, and a light spot decentered from the optical axis on an information storage media that is thick in the case of the $1^{st}$ order diffractive light. Accordingly, the light spot formed by the diffractive light generated as noise can be decentered on the photodetector so that the noise diffractive light that degrades the reproduction signal and the differential push-pull servo signal can be removed.

Therefore, in the compatible optical pickup having the hologram optical device according to aspects of the present invention and the optical information storage medium system including the compatible optical pickup, the quality of a reproduction signal can be secured. Also, when the differential push-pull signal is used as the tracking servo signal, degradation to the sub-push-pull signal is prevented. While described in terms of BD and HD-DVD, it is understood that aspects of the present invention can be used with other media having different thicknesses.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hologram optical device provided in an optical pickup, the optical pickup comprising an objective lens and a light source configured to emit an incident light along an optical axis, the hologram optical device comprising:
   a first hologram area comprising a hologram that is asymmetric with respect to the optical axis and is configured to:
   diffract the incident light to produce a first $0^{th}$ order diffractive light and a first $1^{st}$ order diffractive light; and
   diverge the first $1^{st}$ order diffractive light; and
   a second hologram area provided outside of the first hologram area and comprising a hologram configured to:
   diffract the incident light to produce a second $0^{th}$ order diffractive light and a second $1^{st}$ order diffractive light; and
   converge the second $1^{st}$ order diffractive light;
   wherein the objective lens is configured to:
   focus the first $0^{th}$ order diffractive light to form a first light spot on the optical axis; and
   focus the first $1^{st}$ order diffractive light to form a second light spot at a predetermined distance from the optical axis in a direction perpendicular to the optical axis.

2. The hologram optical device of claim 1, wherein the objective lens is further configured to focus the second $1^{st}$ order diffractive light to form a third light spot at a predetermined distance from the optical axis in a direction perpendicular to the optical axis; and
   the distance between the second light spot of the first $1^{st}$ order diffractive light and the optical axis is not equal to a distance between the third light spot of the second $1^{st}$ order diffractive light and the optical axis.

3. The hologram optical device of claim 1, wherein a diffraction efficiency of the second $0^{th}$ order diffractive light is equal to or greater than a diffraction efficiency of the second $1^{st}$ order diffractive light.

4. The hologram optical device of claim 1, wherein the hologram of the first hologram area comprises a concentric circle pattern.

5. The hologram optical device of claim 1, wherein a diffraction efficiency of the first $0^{th}$ order diffractive light is equal to a diffraction efficiency of the first $1^{st}$ order diffractive light.

6. The hologram optical device of claim 1, wherein the hologram of the second hologram area comprises a concentric circle pattern.

7. The hologram optical device of claim 1, wherein the hologram of the second hologram area comprises a stripe pattern.

8. The hologram optical device of claim 1, wherein the second light spot is formed at a predetermined distance from a plane of the first light spot in a direction parallel to the optical axis.

9. A compatible optical pickup usable with a first information storage medium in accordance with a first standard and a second information storage medium in accordance with a second standard, the first information storage medium and the second information storage medium having different thicknesses, the compatible optical pickup comprising:
- a light source configured to emit an incident light along an optical axis, the incident light comprising a predetermined wavelength;
- an objective lens configured to focus the incident light on an information storage medium that is one of the first information storage medium and the second information storage medium; and
- a hologram optical device comprising:
  - a first hologram area comprising a hologram that is asymmetric with respect to the optical axis and is configured to:
    - diffract the incident light to produce a first $0^{th}$ order diffractive light and a first $1^{st}$ order diffractive light; and
    - diverge the first $1^{st}$ order diffractive light; and
  - a second hologram area provided outside of the first hologram area and comprising a hologram configured to:
    - diffract the incident light to produce a second $0^{th}$ order diffractive light and a second $1^{st}$ order diffractive light; and
    - converge the second $1^{st}$ order diffractive light;
- wherein the objective lens is further configured to:
  - focus the first $0^{th}$ order diffractive light to form a first light spot on the optical axis on the information storage medium; and
  - focus the first $1^{st}$ order diffractive light to form a second light spot at a predetermined distance from the optical axis in a direction perpendicular to the optical axis.

10. The compatible optical pickup of claim 9, wherein the objective lens is further configured to focus the second $1^{st}$ order diffractive light to form a third light spot at a predetermined distance from the optical axis in a direction perpendicular to the optical axis; and
when the information storage medium is the second information storage medium, the second light spot and the third light spot are formed on the second information storage medium, and the distance between the second light spot of the first $1^{st}$ order diffractive light formed on the second information storage medium and the optical axis is not equal to a distance between the third light spot of the second $1^{st}$ order diffractive light formed on the second information storage medium and the optical axis.

11. The compatible optical pickup of claim 9, wherein a diffraction efficiency of the second $0^{th}$ order diffractive light is equal to or greater than a diffraction efficiency of the second $1^{st}$ order diffractive light.

12. The compatible optical pickup of claim 9, wherein the hologram of the first hologram area comprises a concentric circle pattern.

13. The compatible optical pickup of claim 9, wherein a diffraction efficiency of the first $0^{th}$ order diffractive light is equal to a diffraction efficiency of the first $1^{st}$ order diffractive light.

14. The compatible optical pickup of claim 9, wherein the hologram of the second hologram area comprises a concentric circle pattern or a stripe pattern.

15. The compatible optical pickup of claim 9, wherein the thickness of the first information storage medium is 0.1 mm; and
the thickness of the second information storage medium is 0.6 mm.

16. The compatible optical pickup of claim 9, wherein the first standard comprises a Blu-ray Disc (BD) standard; and
the second standard comprises a high definition DVD (HD DVD) standard.

17. The compatible optical pickup of claim 16, wherein the incident light emitted by the light source is a blue light comprising a wavelength between 400 nm and 420 nm.

18. The compatible optical pickup of claim 9, wherein the objective lens has a first numerical aperture (NA) suitable for the first information storage medium; and
an outermost diameter of the first hologram area of the hologram optical device is coupled to the objective lens to provide a second NA suitable for the second information storage medium.

19. The compatible optical pickup of claim 18, wherein the first NA is 0.85; and
the second NA is 0.65.

20. The compatible optical pickup of claim 9, further comprising a photodetector configured to:
receive the first $0^{th}$ order diffractive light reflected by the first information storage medium in a first area of the photodetector; and
receive the first $1^{st}$ order diffractive light reflected by the second information storage medium in a second area of the photodetector that is different from the first area.

21. The compatible optical pickup of claim 9, wherein the second light spot is formed at a predetermined distance from a plane of the first light spot in a direction parallel to the optical axis.

22. An optical information storage medium system comprising:
- a compatible optical pickup usable with a first information storage medium in accordance with a first standard and a second information storage medium in accordance with a second standard, the first information storage medium and the second information storage medium having different thicknesses; and
- a control portion to control the compatible optical pickup;
wherein the compatible optical pickup comprises:
- a light source configured to emit an incident light along an optical axis, the incident light comprising a predetermined wavelength;
- an objective lens configured to focus the incident light on an information storage medium that is one of the first information storage medium and the second information storage medium; and
- a hologram optical device comprising:

a first hologram area comprising a hologram that is asymmetric with respect to the optical axis and is configured to:
diffract the incident light to produce a first $0^{th}$ order diffractive light and a first $1^{st}$ order diffractive light; and
diverge the first $1^{st}$ order diffractive light; and
a second hologram area provided outside of the first hologram area and comprising a hologram configured to:
diffract the incident light to produce a second $0^{th}$ order diffractive light and a second $1^{st}$ order diffractive light; and
converge the second $1^{st}$ order diffractive light;
wherein the objective lens is further configured to:
focus the first $0^{th}$ order diffractive light to form a first light spot on the optical axis on the information storage medium; and
focus the first $1^{st}$ order diffractive light to form a second light spot at a predetermined distance from the optical axis in a direction perpendicular to the optical axis.

23. The optical information storage medium system of claim 22, wherein the objective lens is further configured to focus the second $1^{st}$ order diffractive light to form a third light spot at a predetermined distance from the optical axis in a direction perpendicular to the optical axis; and
when the information storage medium is the second information storage medium, the second light spot and the third light spot are formed on the second information storage medium, and the distance between the second light spot of the first $1^{st}$ order diffractive light formed on the second information storage medium and the optical axis is not equal to a distance between the third light spot of the second $1^{st}$ order diffractive light formed on the second information storage medium and the optical axis.

24. The optical information storage medium system of claim 22, wherein a diffraction efficiency of the second $0^{th}$ order diffractive light is equal to or greater than a diffraction efficiency of the second $1^{st}$ order diffractive light.

25. The optical information storage medium system of claim 22, wherein the hologram of the first hologram area comprises a concentric circle pattern.

26. The optical information storage medium system of claim 22, wherein a diffraction efficiency of the first $0^{th}$ order diffractive light is equal to a diffraction efficiency of the first $1^{st}$ order diffractive light.

27. The optical information storage medium system of claim 22, wherein the hologram of the second hologram area comprises a concentric circle pattern or a stripe pattern.

28. The optical information storage medium system of claim 22, wherein the thickness of the first information storage medium is 0.1 mm; and
the thickness of the second information storage medium is 0.6 mm.

29. The optical information storage medium system of claim 22, wherein the first standard comprises a Blu-ray Disc (BD) standard; and
the second standard comprises a high definition DVD (HD DVD) standard.

30. The optical information storage medium system of claim 29, wherein the incident light emitted by the light source is a blue light comprising a wavelength between 400 nm and 420 nm.

31. The optical information storage medium system of claim 22, wherein the objective lens has a first numerical aperture (NA) suitable for the first information storage medium; and
an outermost diameter of the first hologram area is coupled to the objective lens to provide a second NA suitable for the second information storage medium.

32. The optical information storage medium system of claim 31, wherein the first NA is 0.85; and
the second NA is 0.65.

33. The optical information storage medium system of claim 22, wherein the compatible optical pickup further comprises a photodetector configured to:
receive the first $0^{th}$ order diffractive light reflected by the information storage medium in a first area of the photodetector; and
receive the first $1^{st}$ order diffractive light reflected by the information storage medium in a second area of the photodetector that is different from the first area.

34. The compatible optical pickup of claim 22, wherein the second light spot is formed at a predetermined distance from a plane of the first light spot in a direction parallel to the optical axis.

35. A method of recording data on/reproducing data from a first information storage medium in accordance with a first standard and a second information storage medium in accordance with a second standard using one compatible optical pickup, the first information storage medium and the second information storage medium having different thicknesses, the method comprising:
emitting an incident light along an optical axis, the incident light comprising a predetermined wavelength;
diffracting the incident light with a first hologram that is asymmetric with respect to the optical axis to produce a first $0^{th}$ order diffractive light and a first $1^{st}$ order diffractive light;
focusing the first $0^{th}$ order diffractive light to form a first light spot on the optical axis on the first information storage medium; and
focusing the first $1^{st}$ order diffractive light to form a second light spot on the second information storage medium at a predetermined distance from the optical axis in a direction perpendicular to the optical axis.

36. The method of claim 35, further comprising diffracting the incident light with a second hologram to produce a second $0^{th}$ order diffractive light and a second $1^{st}$ order diffractive light;
wherein the first hologram diverges the first $1^{st}$ order diffractive light; and
the second hologram converges the second $1^{st}$ order diffractive light.

37. The method of claim 35, wherein the second light spot is formed at a predetermined distance from a plane of the first light spot in a direction parallel to the optical axis.

* * * * *